United States Patent [19]

Heian

[11] 4,119,393
[45] Oct. 10, 1978

[54] PAN AGGLOMERATION WITH MECHANICAL PELLET CLASSIFICATION

[75] Inventor: Glenn A. Heian, Franklin, Wis.

[73] Assignee: Allis-Chalmers Corporation, Milwaukee, Wis.

[21] Appl. No.: 757,088

[22] Filed: Jan. 5, 1977

Related U.S. Application Data

[62] Division of Ser. No. 551,724, Feb. 21, 1975, Pat. No. 4,017,264.

[51] Int. Cl.² .................................................. B29B 1/02
[52] U.S. Cl. .................................... 425/222; 425/332; 23/313 P; 264/117
[58] Field of Search .................. 425/8, 332, 222, 402, 425/218, 6, 10; 264/117; 23/313 P, 313 R, 314

[56] References Cited

U.S. PATENT DOCUMENTS

| | | | |
|---|---|---|---|
| 2,889,576 | 6/1959 | Selig | 425/222 |
| 2,994,912 | 8/1961 | Eades | 425/222 |
| 3,030,657 | 4/1962 | Reppert | 425/222 |
| 3,140,326 | 7/1964 | Erck et al. | 425/222 X |
| 3,206,528 | 9/1965 | Coombs et al. | 425/222 X |
| 3,883,281 | 5/1975 | Holley | 425/222 |

Primary Examiner—Robert L. Spicer, Jr.
Attorney, Agent, or Firm—Robert C. Jones

[57] ABSTRACT

A strategically located series of spaced apart classifiers set at varying depths within a pelletizer pan operated to classify the forming pellets and also impart controlled energy into the forming pellets producing pellets of improved quality. Controlled classifying of the forming pellets stabilizes pellet output. With a stabilized pellet output obtained the need for driving the pellet pan with a variable speed device can be eliminated since pan rotation can be maintained at a constant speed.

2 Claims, 6 Drawing Figures

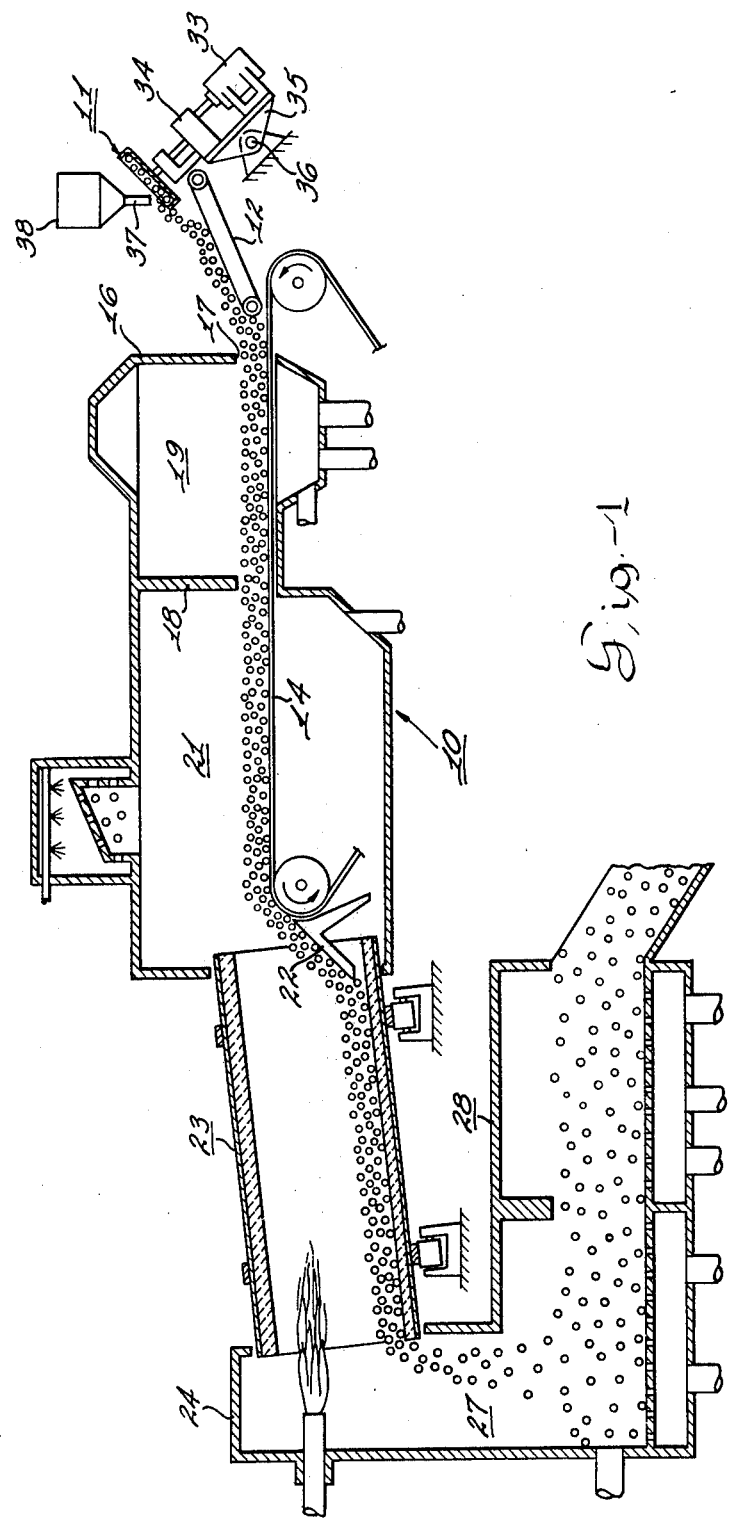

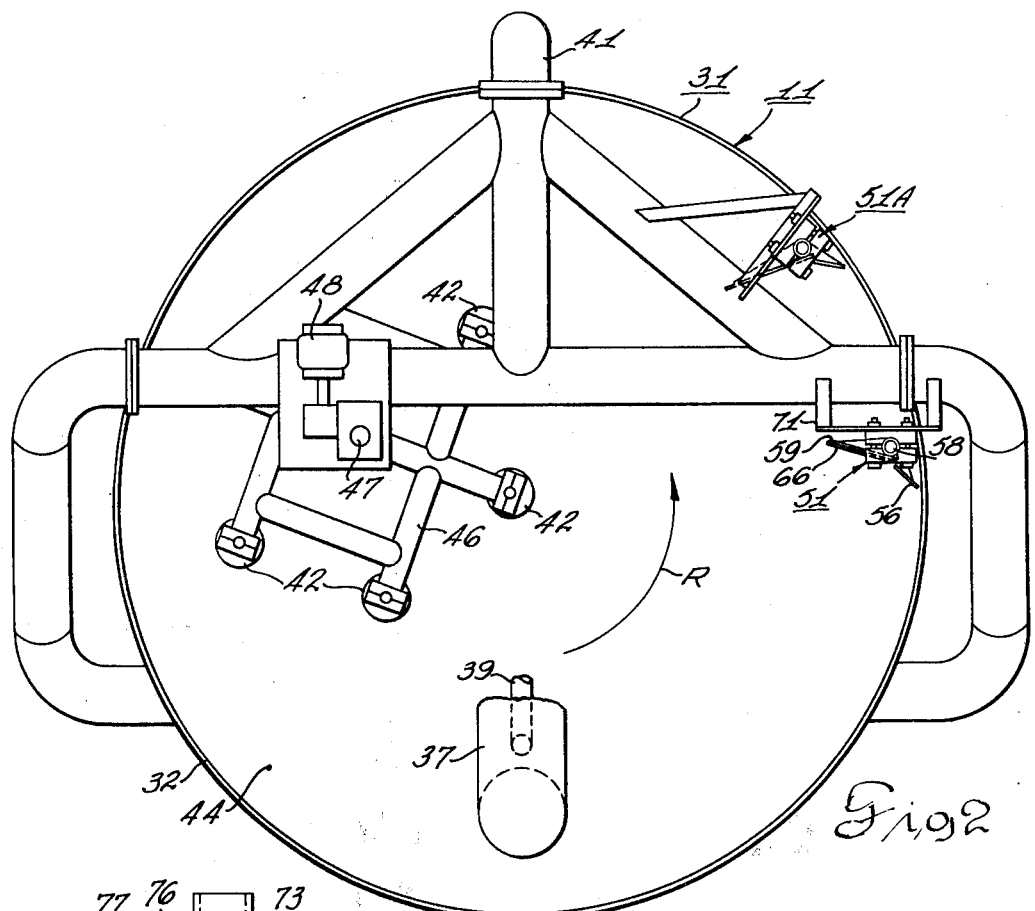
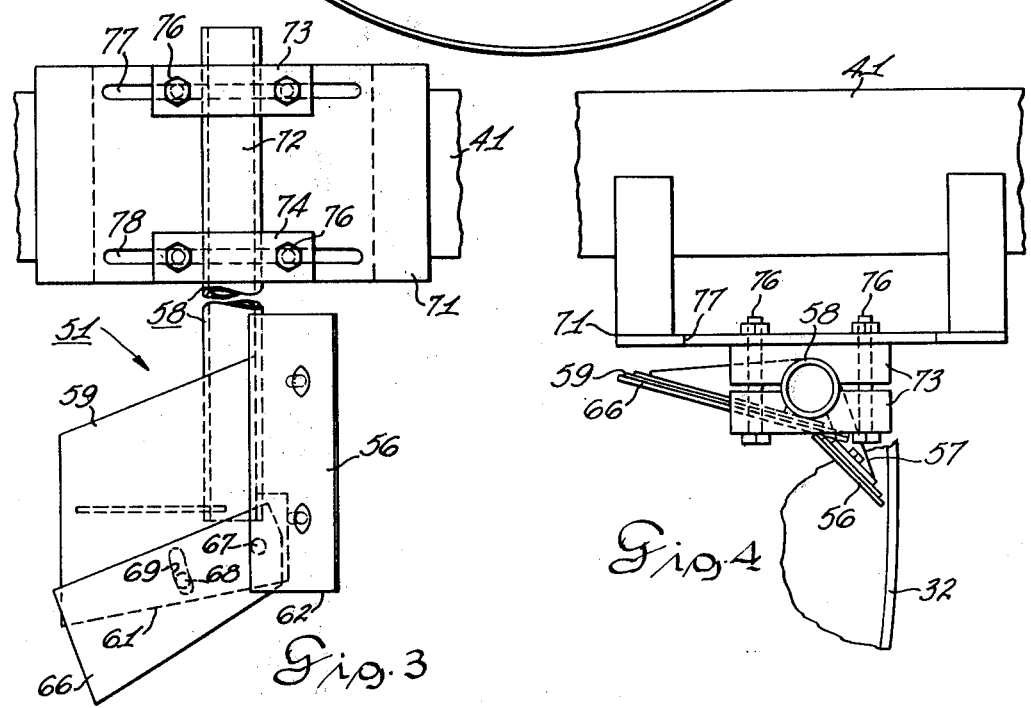

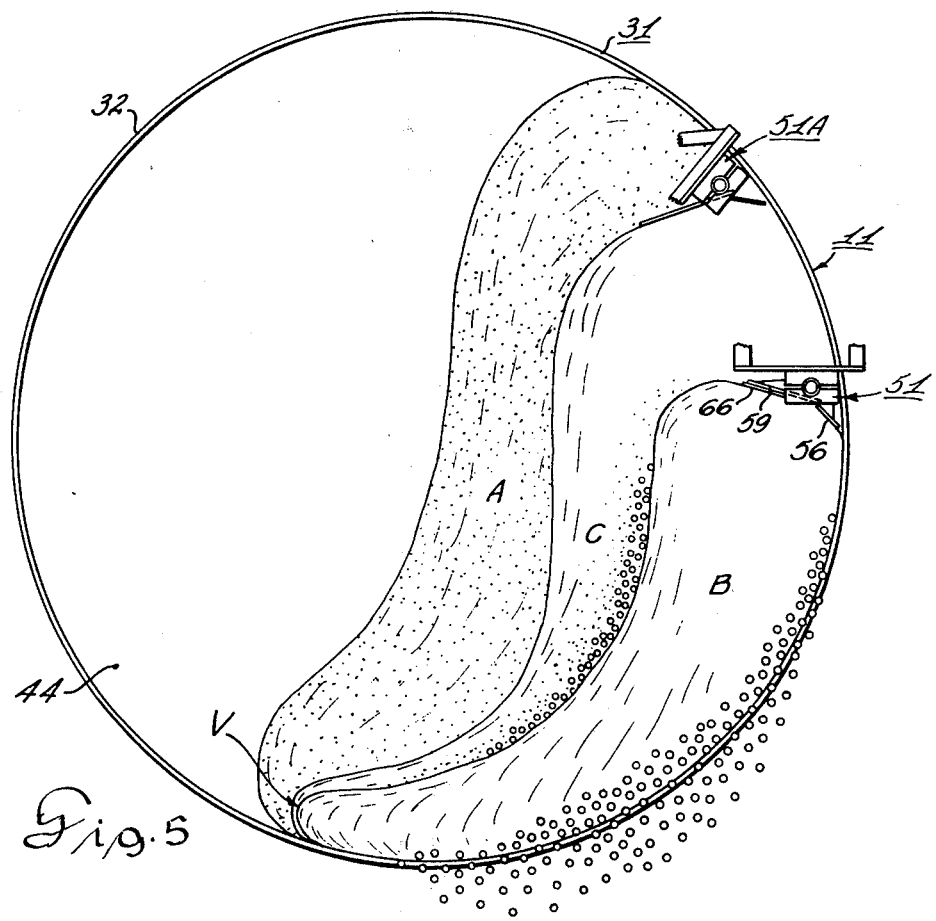
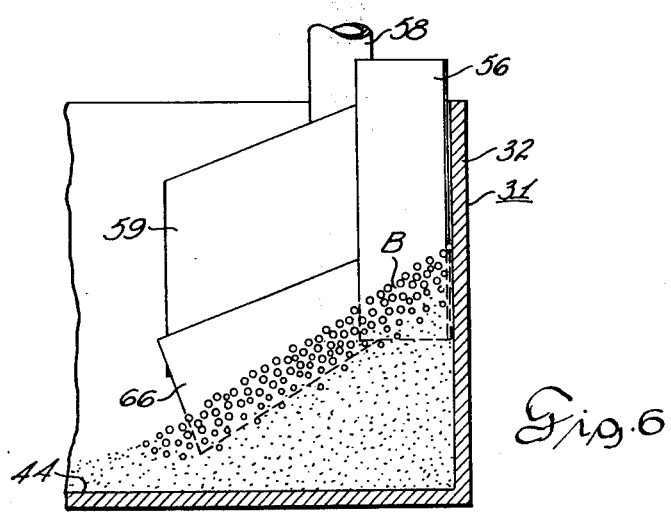

PAN AGGLOMERATION WITH MECHANICAL PELLET CLASSIFICATION

This is a division, of application Ser. No. 551,724 filed Feb. 21, 1975, now U.S. Pat. No. 4,017,264.

BACKGROUND OF THE INVENTION

The present invention relates to treating material and, more specifically, the method and apparatus for classifying and imparting controlled energy into the forming pellets.

Problems in operation of mineral treating apparatus, such as a Portland cement producing system, relate back to the pellet input thereto. Such a system includes a traveling grate on which the material to be treated is deposited and carried through a drying or conditioning chamber wherein the material in the form of pellets is dried. From the drying chamber the pellets are moved to a preheat chamber and thence progressed into a kiln for final burning and thence to a cooler.

Raw material is fed to the system from a pelletizer pan which operates as a positive displacement machine converting the raw material into green pellets or wet balls that are discharged as feed input to the system. The pelletizer pan retains the undersize pellets or balls until they grow to reach the final mature size before discharging. The green pellet or ball forming process in the pan consists basically of: (1) addition of water to the feed material; (2) formation of the nuclei or seed pellets; (3) growth and densification of the seed pellets; and (4) final growth and densification. In each revolution of the pan, the agglomerates and fines are lifted to the maximum height and then fall freely to the lower section of the rotating pan. In the load, large pellets circulate on top of the smaller pellets over a relatively small area in the lower outside portion of the pan close to the rim at the discharge point. Smaller pellets lifted under the larger pellets circulate over a wider area in the pan and become exposed to the water spray and incoming fine material being fed into the pan. Thus, the smaller pellets grow and are then again lifted under the larger pellets.

In the pelletizer pan presently in use, pellet size is a function of: (1) the location of the water spray and feed entry point which controls the rate of pellet seed formation and the degree of pellet growth; (2) uniformity of moisture addition, i.e., a more uniform addition of moisture reduces the variation in the size of the pellets; (3) moisture level—pellet size increases at higher moisture levels; (4) peripheral speed—with high peripheral pan speeds, pellet size increases; and (5) retention time of the pellets in the pan-pellets produced in a relatively short retention time normally have a higher moisture content.

Generally the aforementioned variables all affect the material flow pattern and, hence, pellet seed formation as the degree of moisturizing the fines varies. Moving the larger pellets into the area of the new feed material and water causes the pellets to go out of phase and increase in size and thereafter rapidly decrease in size and thence cycle again. As a result, pan loading decreases momentarily, thus feed output decreases. This is true because as the size of the pellet increases due to increase in the moisture level, the pellets move or flow farther outward occupying more pan volume. Also, increasing the pan peripheral speed causes the pan load to shift outward into the new feed area which also causes an increase in the size of the pellets.

Since the material in the pelletizer pan is sensitive to any kind of change in the aforementioned variables, the pellet feed output of the pan is likewise sensitive to seed pellet change. As a result, pellet pan output is not stable and, thus, the operation of the entire material treating system cycles in accordance with cycle output of the pelletizer pan which has been found to be of substantial twenty minute duration, or the pelletizer pan output is stable but pellet quality is not at a desired level.

It is, therefore, an object of the present invention to provide an improved method and apparatus for classifying pellets formed in a pelletizer pan.

Still another object of the present invention is to provide an improved method and apparatus for imparting controlled energy to the pellets formed in a pelletizing pan to produce a pellet of improved quality and increase pan capacity.

Yet another object of the present invention is to provide an improved method of stabilizing the pellet output of a pelletizer pan.

A still further object of the present invention is to provide an improved method of controlling the classifying of the forming pellets which permits easier direction of water to the dry fines to control the moisture content of the formed pellets.

Another object of the present invention is to provide an improved pelletizer pan which may be driven at a constant speed.

SUMMARY OF THE INVENTION

According to the present invention, strategically located spaced apart pellet classifiers are set at varying depths toward the bottom of the pelletizer pan to deflect the various sizes of forming pellets back to the low area of the rotating pan. The material fines at the lowest level in the pan travel upwardly to the highest rotational point until they roll over cascading downwardly toward the pan's lowest rotational point. As the fines cascade in a return flow, a classifier set at a predetermined height above the pan bottom deflects intermediate size pellets in a cascading fall imparting energy to these pellets. As these intermediate size pellets return in cascading flow to the bottom of the pan at its lowest rotational point, a promiscuous interpenetration of the pellets with the fines occurs. The interpenetration of the various sizes of forming pellets together with the energy that the intermediate size pellets have obtained from the deflecting and accelerating action of the classifier causes a growth in the intermediate size pellet and strengthens the larger forming pellet structure. Additional classifiers are provided and these are set at increasingly higher levels from the bottom of the rotating pan to classify and deflect the increasingly larger size pellets. A number of classifiers may be provided to obtain a strong pellet of the desired size.

DESCRIPTION OF THE DRAWINGS

FIG. 1 is a schematic view in elevation of a material treating system in which the present invention is incorporated;

FIG. 2 is a plan view of the improved pelletizer pan of the present invention showing the location of the classifier;

FIG. 3 is a detailed view in elevation of one of the classifiers;

FIG. 4 is a plan view of the classifier shown in FIG. 3;

FIG. 5 is a plan view of the pelletizer pan, with the supporting structure removed, showing the material flow pattern; and FIG. 6 is a view in section taken through the outer edge of the pelletizer pan, showing the interpenetration of the various sizes of pellets and the portion that the classifier peels off.

DESCRIPTION OF THE PREFERRED EMBODIMENT

As generally shown in FIG. 1, a material treating system 10 may comprise a balling or pelletizing pan 11. A feeder 12 deposits the green untreated pellets of raw materials on a gas pervious traveling grate 14. A housing structure 16 is arranged to enclose a space over the grate 14 and defines a material inlet opening 17. A baffle wall 18 suspended from the roof of the housing 16 to a predetermined distance above the grate 14 operates to divide the space enclosed by housing 16 into a preconditioning or drying chamber 19 and a preheat or preburn chamber 21. Green pellets on the grate 14 will be transported through the drying chamber 19 and thence into the preburn chamber 21, and then discharged down a chute 22 into a refractory lined rotary kiln 23. Rotary kiln 23 slopes downwardly from chute 22 toward a hood 24 that encloses the discharge end of the kiln 23 and defines a passage 27 from the kiln 23 to a cooler 28.

The pelletizer pan is a positive displacement machine which retains undersize pellets or balls until they grow to reach a final natural size before discharging over the rim of the pan. The green ball forming process in the pan basically comprises the addition of water to the feed material fines, the formation of seed pellets, growth and densification of the seed pellets and final growth and densification of the pellets. In each revolution of the pan the agglomerates and fines are lifted to the maximum height and then fall freely to the lower section of the rotating pan. Large pellets or balls circulate on top of the smaller pellets in the load over a small area in the lower outside portion of the pan close to the rim at the discharge point. Smaller pellets are lifted under the large pellets and circulate over a wider area in the pan and become exposed to the water spray and incoming feed material fines and grow.

Unfortunately, as previously mentioned, one problem encountered with the balling device such as the pelletizer pan 11 is a cycling effect in pellet formation. That is, in some cases, the pellet size varies from small to large sizes in a regular time cycle which has been found to be substantially of twenty-minute intervals.

Thus, as the size of the pellets received from the pelletizer pan 11 varies, the operation of the system must be varied to accommodate for the size and quality variation of the pellets being fed into the system. As a result, the output of the system varied accordingly. Another problem encountered in the operation of systems similar to the one described above is the quality of the pellet itself. The strength of the pellet relates directly to the abrasion resistivity that the pellet will have. The greater resistance to abrasion exhibited by the pellets, the less the pellets will tend to dust and break so that a larger final yield is experienced. Thus, increasing the strength of the pellet, producing a more unified size pellet, stabilizing and increasing the system output, and improving the quality of the pellet output are prime objects.

To this purpose, the pelletizer pan 11, FIG. 2., comprises a cylindrical pan 31 having a peripheral axially extending rim or edge 32. The pan 11 is connected to be driven at a constant speed by an A-C motor 33 through a gear box 34. The entire assemblage of pan, gear box and motor is supported on a base 35 for angular positional adjustment about the axis of a shaft 36. A feed spout 37 of a raw material feed hopper 38 directs the raw material into the pan 11 and at the same time water from a spray nozzle 39 is sprayed on the material.

A tool support frame 41, as shown in FIG. 2, overlies the pan and supports a plurality of pan bottom cutters 42 that are operative to maintain the pan bottom surface 44 with a uniform predetermined thickness of raw material. This is for the purpose of maintaining a free flow of material across the pan bottom. The cutters 42 are carried by a frame 46 that is mounted on a rotatable shaft 47. A motor 48 is operatively connected to drive the shaft 47 for rotating the cutters 42 bodily about the axis of the shaft 47 as the pan 11 is rotated. Thus, a continuous milling action on the pan bottom is obtained.

In the prior art, the rotation of the pan lifts the moisturized raw material along the side rim 32 and also along the bottom surface of the pan adjacent the rim to a height well above a horizontal plane that passes through the rotational axis of the pan. As a result, the material generally identified by the letter "A," referred to in FIG. 5, is normally carried from the lower part of the pan up the rising rim of the pan and reaches a maximum peak and cascades inwardly and downwardly in a waterfall-like flow over the pan bottom to the lowest pan area. Thus, the raw material is moved from the lowest pan area up the rising pan edge and rim in a circulatory movement which gradually tends to pelletize the material. As the material cascades over the sloping pan bottom surface, it picks up the material which is being fed into the pan. The layer of forming pellets at the rising rim sector tends to be in layers with the size of the pellets increasing to maximum at the top.

The cascading pellets have a certain amount of energy imparted to them by the cascading free-fall of the material in the circulatory movement. However, as the formed pellets move upwardly, the energy in the pellets is dampened, and the upwardly moving mass is relatively dead. As a result, the production of pellets of a desired size is not constant but varies in a 20 minute cycle pattern from small to large. This results in an unstable system operation reducing system output.

To overcome the undesirable characteristics inherent in the operation of pelletizer pans, a novel method to improve pellet quality, control pellet size, and improve and stabilize pan output has been conceived. The circulatory movement of the mass of material must be forced to classify rather than to allow the classification of pellets to occur as a natural and ultimate result of circulatory movement. That is, the mass of circulatory material must be peeled, varying the depth of the peel depending upon the size of the pellets desired. In other words, a top layer "B" of the circulatory mass in which the largest size pellets occur is forced, in a cascading fall, to return to the lowest rotating area of the pan well before the natural crest or peak of the material "A" fines is reached. Likewise, another layer of relatively smaller pellets "C" at a lower depth is peeled off at a point in the circulatory movement which is somewhat later in the movement after the topmost layer "B" has been peeled and prior to the natural crest "A." This second peeled layer "C" of pellets is also forced in a cascading fall back to the lowest rotational area of the pan. Thus, at least three independent cascading falls of material are created with the layer of fines "A" and the layer of small size pellets "C" interpenetrating in the whirlpool vortex "V," FIG. 5, at the lowest rotational point of the pan. This interpenetration of the various material sizes, that is, the fines "A" and smallest pellets, travel with the pan to the material crest. The intermediate pellets "C" and larger pellets grow with growth being over and above the natural growth experienced due to rotation of the pan.

In addition, the classifier which forces the separation of the larger pellet size, and the classifier at a different level imparts additional energy into the pellets so that a more vigorous association between the pellets occurs. This increases the density and thereby the strength of the pellets resulting in a substantial reduction in dust and fines. Since the various pellet sizes are peeled off of the rotating pan, the availability of the larger sizes are more constant and is not solely dependent upon the rotational movement of the pan. Thus, pellet output from the pan is stabilized and the feed input to the system becomes more constant, eliminating cyclic operation.

Apparatus that has been found effective in practicing the method set forth above is exemplified by the classifiers 51 and 51A depicted in FIG. 2. As indicated in FIG. 2, pan rotation is in a counterclockwise direction, as indicated by the directional arrow "R." The classifiers 51 and 51A are established at different levels above the pan bottom, with the classifier 51 being set at the highest level to force the peel off of the largest size pellets first. The classifier 51A is set to peel off the relatively smaller size pellets at a lower level. While two classifiers 51 and 51A are shown, it will, of course, be recognized that additional classifiers can be utilized depending upon need and the diameter of the pelletizer pan or only one classifier used.

The pellet classifiers 51 and 51A are substantially similar and a description of the classifier 51 and its operation will also apply to the classifier 51A.

As shown, the classifier 51 comprises a vertically disposed blade 56, herein depicted as rectangular in form. The blade 56 is secured to an angularly extending arm 57 that is welded to a tubular supporting member 58. A wing blade 59 is secured to another angularly disposed arm which is welded to the tubular supporting member 58 and extends in the opposite direction relative to the blade 56. The lower edge 61, as shown in FIG. 3, of the wing blade 59 is formed at an obtuse angle relative to the lower edge surface 62 of the blade 56. While the blades 56 and 59 are depicted as being angularly fixed relative to each other, it will be appreciated that the blade 59 could be mounted so as to be angularly adjustable relative to the blade 56.

A bottom blade 66 is disposed at the lower edge of the wing blade 59. The bottom blade is vertically adjustable about a pin 67 carried by the wing blade 59. To lock the bottom blade 66 in an adjusted position, there is provided a clamp screw 68 that is welded to the rear surface of the bottom blade and disposed to extend rearwardly therefrom. The clamp screw 68 is adapted to extend through an arcuate slot 69 formed in the wing blade 59. A nut(not shown) engages on the end of the screw 68 that extends through the slot 69 and operates to lock the bottom blade 66 in an adjusted position to the wing blade 59. The adjustable bottom blade 66 makes it possible to accommodate for the natural angle that the material obtains in the corner area of the junction point of the pan bottom surface with the rim. The angle that the material assumes in this area varies depending upon the slope and the rotational speed of the pan.

The classifier assemblage 51 is carried for vertical positioning movement on the support frame 41. To this end a bracket 71 is welded to a portion of the supporting frame 41 in a position which overlays the rim 32 of the pelletizer pan. The upper end 72 of the tubular support member 58 is disposed in upper and lower clamp block pairs 73 and 74. Bolts 76 which extend through each of the pairs of clamp blocks extend through horizontal slots 77 and 78 in the bracket 71. Thus, horizontal positioning of the classifier assemblage 51 can be effected and the bolts tightened to lock the tubular member 58 in the clamp blocks 73 and 74 while at the same time locking the entire assemblage in a horizontally adjusted position.

I claim:

1. In a material classifier arrangement for a pelletizer pan that is rotatable about an inclined axis and having an agglomerative moisturized raw material supplied thereto for movement without the rotating pan;

a supporting frame;

a material classifier means carried by said supporting frame in position to engage with the agglomerative moisturized raw material carried by said pan at the outer periphery of said pan and at an angle of between 30° to 60° as measured in a clockwise direction from a line which passes through the axis about which said pan rotates and a point which relates to the uppermost position of the pan as viewed from the front of said pan, said classifier means being positioned above the material bed a selected distance to separate and to deflect the larger formed pellets from the smaller pellets from the up-moving moisturized raw material and allow the smaller pellets to continue to travel with the pan and free fall in there own path of travel in a cascading return flow to the bottom of the pan over up-moving agglomerative moisturized raw material to become up-moving agglomerative moisturized raw material to thereby accelerate the motion of the pellets and effect densification and growth of the forming pellets.

2. In a material classifier arrangement for a pelletizer pan that is rotatable about an inclined axis and having agglomerative moisturized raw material supplied thereto for movement with the rotating pan;

a supporting frame;

a classifier supported by said frame in a position at the outer periphery of said pan and at an angle of between 30° to 60° as measured in a clockwise direction from a line which passes through the axis about which said pan rotates and a point which relates to the uppermost position of said pan as viewed from the front of said pan;

said classifier including, a first blade carried by said frame for bodily adjustable movements relative to the pan bottom, said first blade being also adjustable laterally relative to the pan rim;

a second blade carried by said frame for bodily adjustable movement relative to the pan bottom, said second blade also being adjustable laterally relative to the pan rim and inwardly of said first blade in close cooperative association therewith, said first and second blades being angularly adjustable relative to each other and to the pan rim; and, a third blade adjustably supported for positioning relative to the lower edge of said second blade;

whereby the position of said first and second blades, relative to the pan bottom, may be established at any predetermined distances, irrespective of the slope of the pan, and are angularly adjustable relative to the pan rim and said third blade can be adjusted relative to the lower edge of said second blade to effect an operational extension of said second blade to conform to the natural slope of the material in the pan and the combined cooperative effect of all of said blades acting on the agglomerative moisturized raw material in the rotating pan deflects a predetermined layer portion of the up-moving material to return in a cascading return flow to a lower portion of the pan to become up-moving material in which flow the smaller pellets interpenetrate with the larger cascading pellets to effect densification of all the pellets and the slope of the untouched material will be established to conform with the natural slope of the raw material prior to classification.

* * * * *